(12) United States Patent
Kurihara et al.

(10) Patent No.: US 11,761,872 B2
(45) Date of Patent: Sep. 19, 2023

(54) VISCOMETER AND METHOD FOR MEASURING VISCOSITY

(71) Applicant: TOHOKU UNIVERSITY, Sendai (JP)

(72) Inventors: Kazue Kurihara, Sendai (JP); Masashi Mizukami, Sendai (JP); Motohiro Kasuya, Sendai (JP)

(73) Assignee: TOHOKU UNIVERSITY, Miyagi (JP)

( * ) Notice: Subject to any disclaimer, the term of this patent is extended or adjusted under 35 U.S.C. 154(b) by 0 days.

(21) Appl. No.: 17/757,427

(22) PCT Filed: Nov. 2, 2020

(86) PCT No.: PCT/JP2020/041123
§ 371 (c)(1),
(2) Date: Jun. 15, 2022

(87) PCT Pub. No.: WO2021/124713
PCT Pub. Date: Jun. 24, 2021

(65) Prior Publication Data
US 2023/0023301 A1    Jan. 26, 2023

(30) Foreign Application Priority Data
Dec. 18, 2019    (JP) .................. 2019-228626

(51) Int. Cl.
*G01N 11/10*    (2006.01)
*G01N 11/00*    (2006.01)

(52) U.S. Cl.
CPC ...... *G01N 11/10* (2013.01); *G01N 2011/0066* (2013.01)

(58) Field of Classification Search
CPC .................. G01N 11/10; G01N 2011/0066
See application file for complete search history.

(56) References Cited

U.S. PATENT DOCUMENTS 3,706,221 A * 12/1972 Fletcher ............... G01N 11/10
73/54.37
5,491,408 A * 2/1996 Rousseau ........... G01N 33/4905
600/369

(Continued)

FOREIGN PATENT DOCUMENTS

JP    09257606 A    10/1997
JP    2001116675 A    4/2001

(Continued)

OTHER PUBLICATIONS

"Korean Application Serial No. 10-2022-7024323, Office Action dated Oct. 18, 2022", w English Translation, (dated Oct. 18, 2022), 7 pgs.

(Continued)

*Primary Examiner* — Alexander Satanovsky
*Assistant Examiner* — Lynda Dinh
(74) *Attorney, Agent, or Firm* — Schwegman Lundberg & Woessner, P.A.

(57) ABSTRACT

There are provided a viscometer that can accurately measure a bulk viscosity of a small amount of a liquid sample such as 100 μL or less, and a method for measuring viscosity. A viscometer (1) comprises a fixing member (31), an upper unit (10), a lower unit (11), and an information processing unit (50). A method for measuring viscosity comprises measuring a viscosity of the sample by measuring a response voltage during resonance from a detecting means (19) that detects displacement of a leaf spring (17) in one direction due to vibration of the upper unit (10) through applying an AC voltage to a piezoelectric element (15) while changing a frequency by the information processing unit (50).

13 Claims, 5 Drawing Sheets

(56) References Cited

U.S. PATENT DOCUMENTS

| | | | | |
|---|---|---|---|---|
| 5,705,738 A | * | 1/1998 | Kurihara | G01N 13/00 |
| | | | | 73/54.39 |
| 6,484,567 B1 | | 11/2002 | Hajduk et al. | |
| 6,796,168 B1 | * | 9/2004 | Goldstein | G01N 11/04 |
| | | | | 73/54.04 |
| 2003/0154772 A1 | * | 8/2003 | Jackson | G01N 11/14 |
| | | | | 73/54.28 |
| 2009/0145231 A1 | * | 6/2009 | Kurihara | G01N 19/04 |
| | | | | 73/579 |
| 2016/0263577 A1 | * | 9/2016 | Ismagilov | B01L 3/523 |
| 2016/0341647 A1 | | 11/2016 | Krenn et al. | |

FOREIGN PATENT DOCUMENTS

| | | |
|---|---|---|
| JP | 2002082043 A | 3/2002 |
| JP | 2012137352 A | 7/2012 |
| KR | 20100081526 | 7/2010 |
| KR | 20190024310 | 3/2019 |
| WO | WO-2007037241 A1 | 4/2007 |

OTHER PUBLICATIONS

"International Application Serial No. PCT/JP2020/041123, International Search Report dated Jan. 19, 2021", w/ English Translation, (dated Jan. 19, 2021), 6 pgs.

Mori, Takamasa, et al., "Measurement of Apparent Viscosity of Various Fluids by Using B-Type and Vibration-Type Viscometers", Nihon Reoroji Gakkaishi 45.4, (2017), pp. 157-165.

* cited by examiner

VISCOMETER AND METHOD FOR MEASURING VISCOSITY

PRIORITY APPLICATIONS

This application is a U.S. National Stage Filing under 35 U.S.C. § 371 from International Application No. PCT/JP2020/041123, filed on Nov. 2, 2020, and published as WO2021/124713 on Jun. 24, 2021, which claims the benefit of priority to Japanese Application No. 2019-228626, filed on Dec. 18, 2019; the benefit of priority of each of which is hereby claimed herein, and which applications and publication are hereby incorporated herein by reference in their entireties.

TECHNICAL FIELD

The present invention relates to a viscometer and a method for measuring the viscosity.

BACKGROUND ART

For example, sample volume for measuring its viscosity is 100 µL or less in some cases. For example, there are cases in which a sample is very expensive, it takes time to produce a sample, or it is technically difficult to prepare a large amount of a sample.

As the method for measuring the viscosity of a liquid, for example, a method using a capillary viscometer, a falling ball viscometer, a coaxial double cylindrical rotational viscometer, a single cylindrical rotational viscometer, a conical-flat plate rotational viscometer or a vibration type viscometer, as specified in JIS Z 8803:2011, is known.

Non-Patent Literature 1 describes a method for evaluating the viscosity using a vibration type viscometer.

The method for evaluating the viscosity using a vibration type viscometer described in Non-Patent Literature 1 is a method in which a vibrator immersed in a liquid is resonated to perform a reciprocating motion, the liquid around the vibrator is sheared, and the viscosity of the liquid is obtained based on the shearing stress applied to the vibrator.

CITATION LIST

Non-Patent Literature

[Non-Patent Literature 1]
Takamasa Mori, and 3 others, "Measurement of apparent viscosity of various fluids using a B type viscometer and a vibration viscometer," Journal of the Society of Rheology, Japan, Sep. 1, 2017, Vol. 45, No. 4, pp. 157-165

SUMMARY OF INVENTION

Technical Problem

However, in the vibration type viscometer described in Non-Patent Literature 1, since the viscosity is measured when the entire vibrator is immersed in the liquid, a large amount of the liquid (for example, 35 mL in this document) is necessary. Therefore, for example, it is not suitable for measuring the viscosity of a small amount of a liquid sample such as 100 µL or less.

In addition, for a viscometer with regard to the basic characteristics of liquids, simplicity of operation of a device and ease of manufacture are also required.

An object of the present invention is to provide a viscometer that can accurately measure a bulk viscosity of a small amount of a liquid sample such as 100 µL or less, and a method for measuring the viscosity.

Solution to Problem

The inventors thought that a bulk viscosity of a small amount of a liquid sample such as 100 µL or less could be measured using a resonance device as shown in a physical model of FIG. 3, and completed the present invention.

The present invention includes the following [1] to [16].

[1] A viscometer comprising a fixing member, an upper unit, a lower unit, and an information processing unit, wherein the upper unit comprises a piezoelectric element, an upper disk substrate that is disposed on the lower unit side of the piezoelectric element, a leaf spring, and detecting means that detects displacement of the leaf spring in the one direction, the lower unit comprising a lower disk substrate, a lower disk holder that fixes the lower disk substrate, and a stage on which the lower disk holder is placed, the leaf spring supports the upper disk substrate such that it is able to vibrate with respect to the fixing member in one direction, the piezoelectric element drives upper disk substrate, and the information processing unit is connected to the detecting means that detects displacement of the leaf spring in the one direction via a signal cable, and wherein the stage is able to be displaced in a certain direction such that a distance between a lower surface of the upper disk substrate of the upper unit and an upper surface of the lower disk substrate of the lower unit is able to be changed.

[2] The viscometer according to [1], further comprising a measuring means that measures the distance between the lower surface of the upper disk substrate and the upper surface of the lower disk substrate.

[3] The viscometer according to [2], further comprising a drive system that displaces the stage in a certain direction, wherein the distance between the lower surface of the upper disk substrate and the upper surface of the lower disk substrate is able to be changed by the drive system while performing measurement by the measuring means.

[4] The viscometer according to [3], wherein the distance between the lower surface end of the upper disk substrate and the upper surface of the lower disk substrate is able to be changed by separating from a contact position while measuring the distance by a distance measuring device.

[5] The viscometer according to any one of [1] to [4], wherein the distance between the lower surface of the upper disk substrate and the upper surface of the lower disk substrate is 0.1 to 1,000 µm.

[6] The viscometer according to any one of [1] to [5], wherein the viscosity of a measurable sample is 0.1 to 20,000 mPa·s.

[7] The viscometer according to any one of [1] to [6], wherein the viscosity of a measurable sample is 0.5 to 10,000 mPa·s.

[8] The viscometer according to any one of [1] to [7], wherein the volume of a measurable sample is 1 to 100 µL.

[9] The viscometer according to any one of [1] to [8], wherein the volume of a measurable sample is 1 to 50 µL.

[10] The viscometer according to any one of [1] to [9], wherein the volume of a measurable sample is 1 to 20 μL.

[11] The viscometer according to any one of [1] to [9], wherein the volume of a measurable sample is 5 to 20 μL.

[12] The viscometer according to any one of [1] to [11], wherein a measurable sample contains particles.

[13] The viscometer according to any one of [1] to [12], wherein a measurable sample is an electrolyte.

[14] The viscometer according to any one of [1] to [12], wherein a measurable sample is a body fluid of a living organism.

[15] The viscometer according to any one of [1] to [12], wherein a measurable sample is a liquid drug.

[16] A method for measuring the viscosity, comprising:
disposing a sample in a sample insertion part between a lower surface of the upper disk substrate and an upper surface of the lower disk substrate in the viscometer according to any one of [1] to [15], and measuring a viscosity of the sample by measuring a response voltage during resonance from the detecting means that detects displacement of the leaf spring in the one direction due to vibration of the upper unit through applying an AC voltage to the piezoelectric element while changing a frequency by the information processing unit.

Advantageous Effects of Invention

According to the present invention, it is possible to provide a viscometer that can accurately measure a bulk viscosity of a small amount of a liquid sample such as 100 μL or less, and a method for measuring the viscosity.

DESCRIPTION OF EMBODIMENTS

Figure 1:
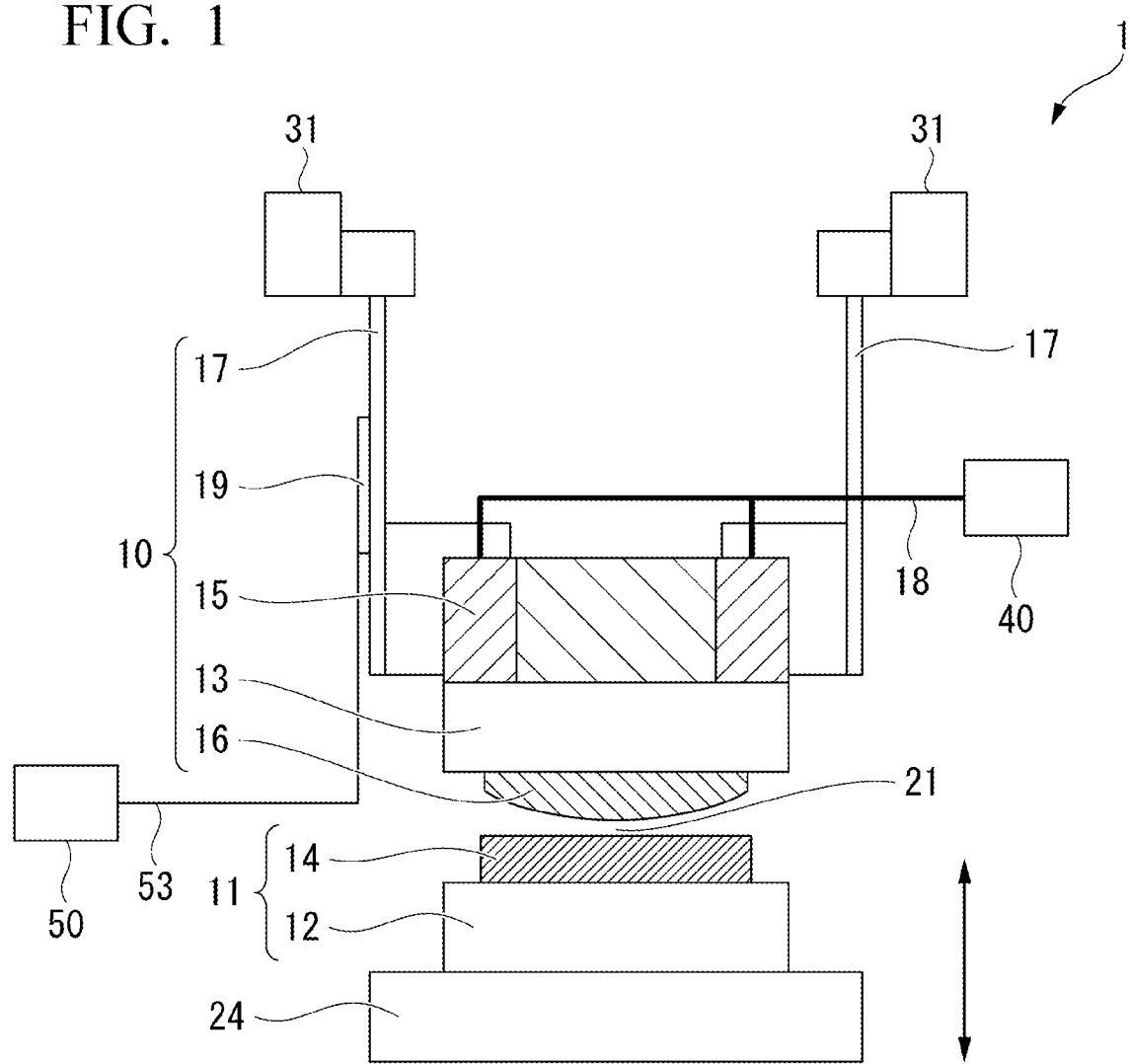
FIG. 1 is a schematic configuration diagram of one embodiment of a viscometer of the present invention.

Hereinafter, a viscometer of an embodiment according to the present invention will be described with reference to the drawings.

Here, in the drawings used in the following description, in order to facilitate understanding of features of the present invention, feature parts are enlarged for convenience of illustration in some cases, and dimensional proportions and the like of components are not necessarily the same as those of actual components.

Figure 2:
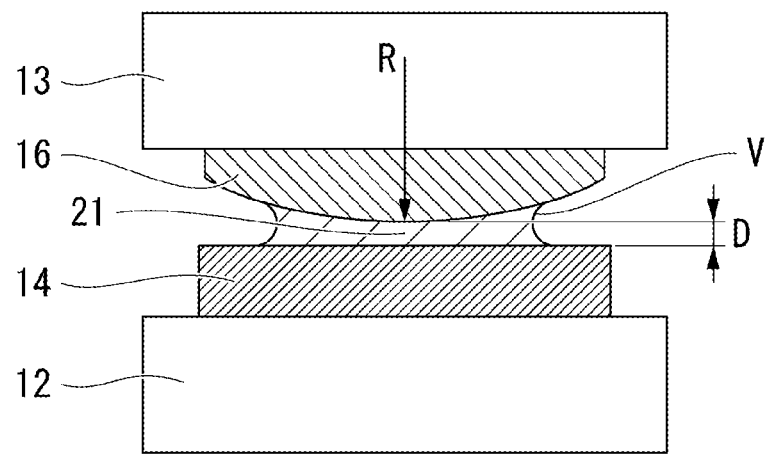
FIG. 2 is an enlarged view of the vicinity of a sample insertion part of the viscometer of the present invention shown in FIG. 1.

FIG. 1 is a schematic configuration diagram showing a viscometer according to the present invention. FIG. 2 is an enlarged view of the vicinity of a sample insertion part of the viscometer shown in FIG. 1. Here, in FIG. 2, components the same as those shown in FIG. 1 are denoted with the same reference numerals, and detailed descriptions thereof will be omitted.

A viscometer 1 comprises a fixing member 31, an upper unit 10, a lower unit 11, and an information processing unit 50.

The upper unit 10 comprises a piezoelectric element 15, an upper disk substrate 16 fixed below the piezoelectric element 15, a leaf spring 17 that supports the upper disk substrate 16 such that it can vibrate with respect to the fixing member 31 in one direction and a means 19 that detects displacement of the leaf spring 17 in one direction.

The upper disk substrate 16 is disposed on the lower unit 11 side of the piezoelectric element 15 via an upper disk holder 13.

In the lower unit 11, a lower disk substrate 14 and a lower disk holder 12 that fixes the lower disk substrate 14 are placed on a stage 24.

The stage 24 can be displaced in a certain direction by a drive system (not shown), and the distance between the lower surface of the upper disk substrate 16 and the upper surface of the lower disk substrate 14 (hereinafter referred to as a "distance D" in some cases) is variable.

Since the distance D is variable, it is also useful when the sample is placed on the lower disk substrate 14.

It is preferable that the upper unit 10 and the lower unit 11 be disposed above and below each other in the vertical direction. In this case, the leaf spring 17 is parallel to the vertical direction, and the drive system can displace the stage 24 in the vertical direction.

As shown in FIG. 1 and FIG. 2, the lower surface of the upper disk substrate 16 is a surface facing the lower disk substrate 14 when the upper unit 10 and the lower unit 11 are disposed above and below each other in the vertical direction. As shown in FIG. 1 and FIG. 2, the upper surface of the lower disk substrate 14 is a surface facing the upper disk substrate 16 when the upper unit 10 and the lower unit 11 are disposed above and below each other in the vertical direction.

The information processing unit 50 is connected to a strain gauge 19 via a signal cable 53.

Preferably, the viscometer 1 further comprises a piezoelectric element drive unit 40.

The piezoelectric element drive unit 40 comprises a function generator and an amplifier. The piezoelectric element drive unit 40 applies an AC voltage to the piezoelectric element 15 via an electric cable 18 and vibrates the piezoelectric element 15. In addition, the piezoelectric element drive unit 40 is connected to the information processing unit 50 via a signal cable (not shown), and may transmit information such as a frequency of an AC voltage applied to the piezoelectric element 15.

The means 19 that detects displacement of the leaf spring 17 in one direction is, for example, a strain gauge, a capacitive displacement meter or a laser displacement meter.

Preferably, one or more strain gauges are fixed on the surface of the leaf spring 17.

Preferably, the capacitance meter and the laser displacement meter are placed so that the displacement (amplitude) of the leaf spring 17 in one direction can be measured in a non-contact manner.

When the strain gauge is used as the means 19 that detects displacement of the leaf spring 17 in one direction, it is possible to simplify the structure of the viscometer and improve the productivity.

In the viscometer 1 of the present invention, for ease of attachment, the lower surface of the upper disk substrate 16 is a spherical surface having a radius of curvature R, and the upper surface of the lower disk substrate 14 is a flat surface. Regarding the lower surface of the upper disk substrate 16 and the upper surface of the lower disk substrate 14, a spherical surface, a cylindrical surface, a flat surface, or a curved surface other than a spherical surface or a cylindrical surface may be used for each independently. The upper disk substrate 16 and the lower disk substrate 14 may be flat plates, but it is not always easy to install flat plates parallel to each other. In order to avoid this difficulty, it is conceivable to dispose two semi-cylinders orthogonally as the upper disk substrate 16 and the lower disk substrate 14. As a disposition in which attachment becomes easier, a combination in which the lower surface of the upper disk substrate 16 is a spherical surface and the upper surface of the lower disk substrate 14 is a flat surface is selected.

When one or both of the lower surface of the upper disk substrate 16 and the upper surface of the lower disk substrate are a curved surface (comprising a spherical surface, a cylindrical surface, a flat surface, or a curved surface other than a spherical surface or a cylindrical surface), the radius of curvature R is not particularly limited, and can be, for example, within a range of 1 to 1,000 mm. The radius of curvature R may be changed depending on the viscosity of the liquid sample. For example, it is preferable to increase the radius of curvature R for a low-viscosity liquid sample, and it is preferable to decrease the radius of curvature R for a high-viscosity liquid sample.

The upper disk substrate 16 and the lower disk substrate 14 each can be independently formed of a material such as quartz, silica, glass, a synthetic resin or mica, but the material is not limited thereto, and a wide range of materials that are stable in a measurement liquid can be used.

In order to measure the distance D between the surfaces, various distance measuring means such as a Newton ring, a laser displacement meter and a capacitive displacement meter can be used. In addition, the distance D between the surfaces can be changed by the drive system while measuring the distance D, but it can be more easily changed by separating from the contact position while measuring the distance by a distance measuring device.

In the viscometer 1 of the present invention, the distance D between the lower surface of the upper disk substrate 16 and the upper surface of the lower disk substrate 14 is fixed, and the viscosity can be easily measured.

In the viscometer 1 of the present invention, when the distance D is fixed at a sufficiently large value, it can be suitably used for measuring the bulk viscosity of the liquid.

In the viscometer of the present invention, preferably, the distance D can be adjusted within a range of 0.1 to 1,000 μm.

When the viscosity of the sample is measured using the viscometer 1 of the present invention, the distance D is preferably 0.1 to 1,000 μm, more preferably 0.5 to 500 μm, still more preferably 1 to 100 μm, yet more preferably 2 to 50 μm, and even more preferably 5 to 20 μm.

As shown in examples to be described below, the viscometer 1 of the present invention can measure the viscosity of the sample inserted into a sample insertion part 21 based on the amplitude of the AC voltage applied to the piezoelectric element and the amplitude of the response voltage during resonance.

When the viscosity of the sample is measured using the viscometer 1 of the present invention, the viscosity η of the sample is preferably 0.1 to 20,000 mPa·s and more preferably 0.5 to 10,000 mPa·s so that more accurate measurement results can be obtained.

When the viscosity of the sample is measured using the viscometer 1 of the present invention, the volume V of the sample is preferably 1 to 100 μL, more preferably 1 to 50 μL, still more preferably 1 to 20 μL, yet more preferably 5 to 20 μL, and even more preferably 5 to 10 μL so that more accurate measurement results can be obtained.

When the viscosity of the sample is measured using the viscometer 1 of the present invention, the sample may contain particles. Some conventional viscometers cannot measure the viscosity of a sample containing particles.

The particle diameter of the particles is not particularly limited as long as it is within a range in which the distance D between the lower surface of the upper disk substrate 16 and the upper surface of the lower disk substrate 14 can be adjusted, but is preferably ½ or less and more preferably ¼ or less of the distance D. For example, when the distance D is 20 μm, the particle diameter of the particles is preferably 10 μm or less, and more preferably 5 μm or less. In the viscometer 1 of the present invention, when the distance D between the lower surface of the upper disk substrate 16 and the upper surface of the lower disk substrate 14 is adjusted, for example, it can handle measurement of the viscosity of a sample containing particles of 5 μm or more. Here, for the particle diameter of the particles, a minimum Feret's diameter is used.

When the viscosity of the sample is measured using the viscometer 1 of the present invention, the sample to be measured is not particularly limited to a liquid. The liquid sample can be a pure substance or a mixture. In addition, when the liquid sample is a mixture, it may be a true solution, a colloidal solution, a dispersion liquid or the like.

Examples of measurable samples by the viscometer 1 of the present invention comprise an electrolyte, a body fluid of living organisms and a liquid drug.

Examples of electrolyte comprise an electrolyte of an electrolytic capacitor, an electrolyte of a battery and an ionic liquid. Examples of electrolyte of a battery comprise an electrolyte of a lithium ion battery. In particular, the increase in viscosity of the electrolyte of a battery due to repeated charging and discharging is an index of performance deterioration, and it is important to measure this viscosity in order to prevent accidents. However, it is difficult and dangerous to collect the electrolyte from an actual battery, and the collectable amount is about 100 μL. Therefore, the viscometer 1 of the present invention that can measure the viscosity of a small amount of a sample is useful.

Examples of body fluids of the living organisms comprise blood, lymph, interstitial fluids and coelomic fluids. In particular, since blood has an increased viscosity due to hyperglycemia or hypercholesterolemia, it is important to measure the viscosity in order to diagnose these diseases. Therefore, the viscometer 1 of the present invention which is less invasive and can measure the viscosity of a small amount of a sample containing particles such as red blood cells is useful.

Examples of liquid drugs comprise a dispersion liquid such as a liposome suspension, solutions such as those of an immunoglobulin preparation and antibody drugs, and liquids such as ω-3 fatty acids. In particular, viscosity is important as a molecular design optimization index of a drug delivery system (DDS) such as a liposome suspension. Therefore, the viscometer 1 of the present invention that can measure the viscosity of a small amount of a sample containing particles such as liposome is useful.

When the viscosity of the sample is measured using the viscometer 1 of the present invention, preferably, a sample is disposed in a gap (the sample insertion part 21) between the lower surface of the upper disk substrate 16 and the upper surface of the lower disk substrate 14, an AC voltage (an amplitude $U_{in}$ of an applied voltage) is applied to the piezoelectric element 15 by the piezoelectric element drive unit 40 while changing the frequency, and thus a response voltage (an amplitude $U_{out}$ of a response voltage) during resonance from the means 19 that detects displacement of the leaf spring 17 in one direction due to vibration of the upper unit 10 is measured by the information processing unit 50, and the viscosity of the sample is measured.

In the information processing unit 50, a peak intensity ratio of (an amplitude $U_{out}$ of a response voltage)/(an amplitude $U_{in}$ of an applied voltage) is calculated from the response voltage during resonance from the means 19 that detects displacement of the leaf spring 17 in one direction, and additionally, it is preferable to perform a process of converting the peak intensity ratio into the viscosity according to the formula of a curve expressing the relationship between the peak intensity ratio and the viscosity.

As shown in examples to be described below, the viscometer 1 of the present invention can measure the viscosity of the sample inserted into the sample insertion part 21 based on a resonance curve obtained from the amplitude of the AC voltage (that is, an applied voltage) and the amplitude of the response voltage with respect to the frequency.

Figure 3:
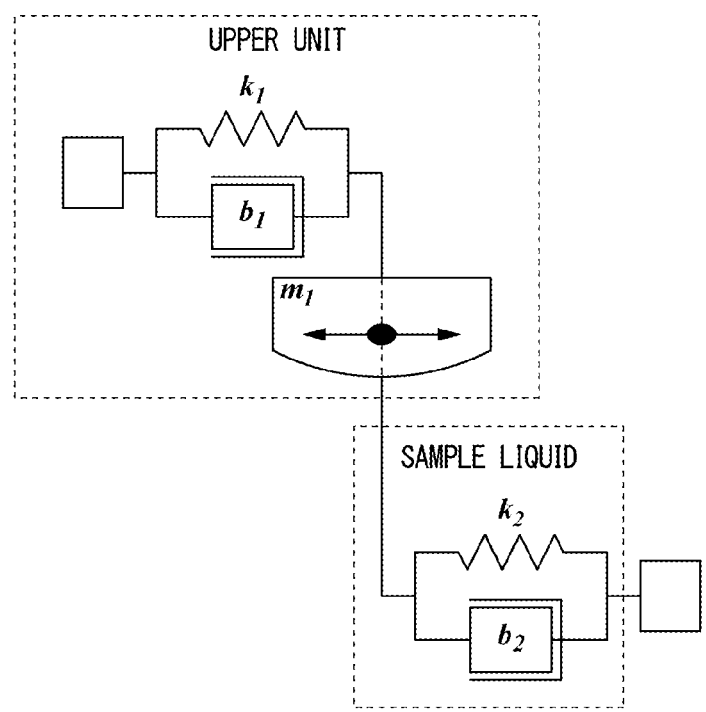
FIG. 3 is a schematic view showing a physical model used for analysis of a resonance curve of the viscometer of the present invention shown in FIG. 1.

FIG. 3 is a schematic view showing a physical model used for analysis of a resonance curve of the viscometer shown in FIG. 1. As parameters of the upper unit 10, a viscosity term $b_1$, an elasticity term $k_1$, and an effective mass $m_1$ are conceivable. As the sample liquid part, a viscosity term $b_2$ and an elasticity term $k_2$ are conceivable. Using these parameters, the equation of motion of the lower surface of the upper disk substrate 16 can be expressed as follows.

[Math. 1]

$$m_1 \frac{d^2 x_1}{dt^2} + (k_1 + k_2)x_1 + (b_1 + b_2)\frac{dx_1}{dt} = F\exp(i\omega t) \quad (4)$$

Here, $x_1$ indicates a displacement of the lower surface of the upper disk substrate 16 in the horizontal direction, and $F\exp(i\omega t)$ indicates an external force from the piezoelectric element 15. When a differential equation of Formula (4) is solved with a stationary solution of $x_1$ as $x_1 = X_1 \exp(i\omega t + \varphi_1)$, an analytic solution of the amplitude ($X_1$) can be obtained. From the solution of $X_1$, a theoretical formula of the resonance curve ($U_{out}/U_{in}$ vs $\omega$) can be expressed as follows.

[Math. 2]

$$\left|\frac{U_{out}}{U_{in}}AS\right|_{spring} = C\sqrt{\frac{1}{((k_1+k_2)-m_1\omega^2)^2 + ((b_1+b_2))^2\omega^2}} \quad (5)$$

For $m_1$, a measured value of the mass of the upper unit is used. In Formula (5), $b_2$ and $k_2$ are set to zero, a resonance curve of air separation (AS) is fitted, and the parameters $k_1$ and $b_1$ of the upper unit 10, and an apparatus constant C are determined.

The parameters ($b_2$, $k_2$) of the sample part are determined by fitting the resonance curve measured when the sample is inserted into the sample insertion part 21 between the lower surface of the upper disk substrate 16 and the upper surface of the lower disk substrate 14.

Here, the relationship between the viscosity parameter $b_2$ (Ns/m) and the viscosity $\eta$ (N/m²·s=Pa·s) is preferably expressed as a constant function. In particular, the relationship is more preferably expressed as a linear function such as $b_2 = C' \cdot \eta$.

EXAMPLES

Hereinafter, the present invention will be described in more detail with reference to examples. However, the present invention is not limited to the following examples, and various modifications can be made as long as the spirit and scope of the present invention are not changed.

Example 1

Using the viscometer shown in FIG. 1, the viscosities of water (bulk viscosity: 1.0 mPa·s), diethylene carbonate (bulk viscosity: 0.8 mPa·s), and two types of a viscosity standard solution (bulk viscosity: 2.0 mPa·s and 8.3 mPa·s) were measured.

The radius of curvature R of the upper disk was 20 mm, the distance D was 8 μm, and the volume V of the sample liquid was 20 μL.

In the information processing unit 50, a resonance curve obtained from the output of the strain gauge 19 was subjected to physical model analysis, the viscosity parameter $b_2$ (N·s/m) was calculated, and the viscosity of the sample was determined from a straight line (calibration curve) expressing the relationship between the viscosity and the viscosity parameter $b_2$ created in advance.

Figure 4:
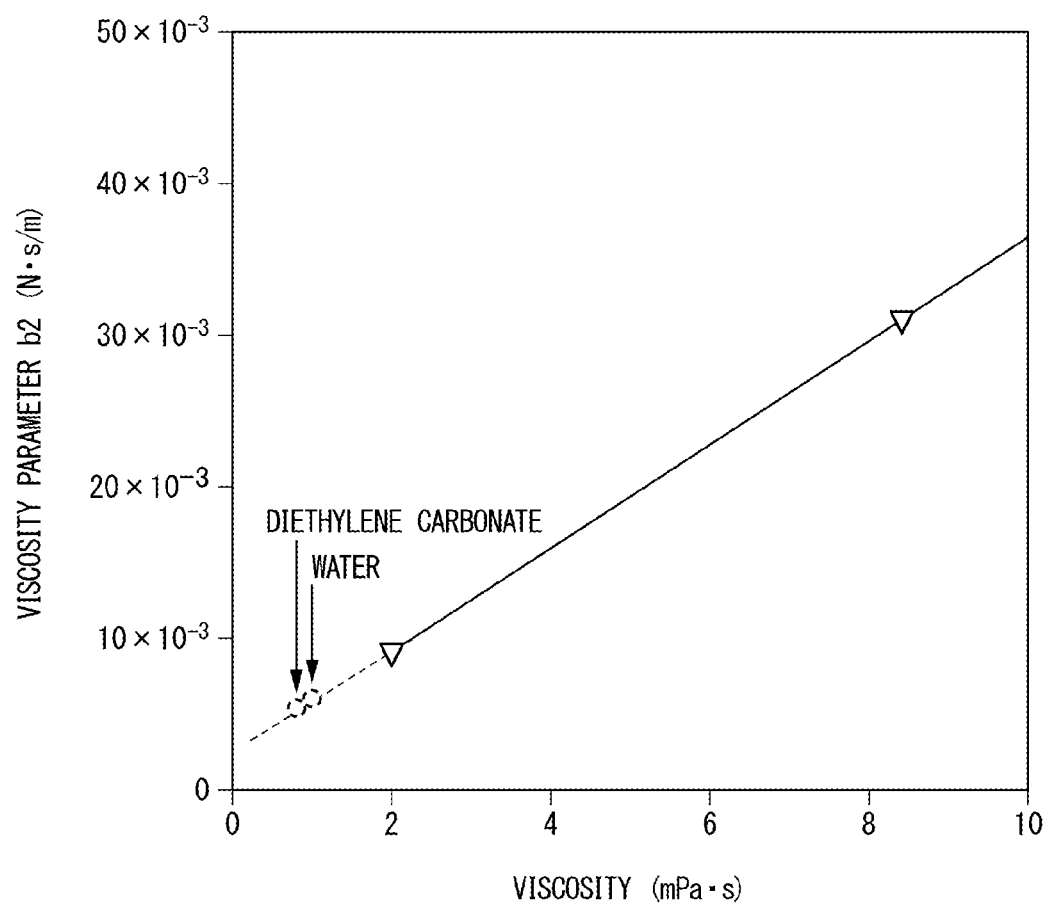
FIG. 4 is a graph showing the relationship between a viscosity and a viscosity parameter b2 in a low viscosity region.

FIG. 4 shows the relationship between the viscosity (mPa·s) of the sample liquid and the viscosity parameter $b_2$ (N·s/m). Linearity was confirmed within the measured range. In addition, since diethylene carbonate and water could be distinguished by the viscosity, it showed that a viscosity difference of 0.1 mPa·s could be measured.

Using the viscometer shown in FIG. 1, the viscosities of five types of a viscosity standard solution (bulk viscosity: 43 mPa·s, 180 mPa·s, 483 mPa·s, 1,800 mPa·s, and 12,000 mPa·s) were measured.

The radius of curvature R of the upper disk was 6.8 mm, the distance D was 20 μm, and the volume V of the sample liquid was 20 μL.

In the information processing unit 50, a resonance curve obtained from the output of the strain gauge 19 was subjected to physical model analysis, the viscosity parameter $b_2$ (N·s/m) was calculated, and the viscosity of the sample was determined from a curve (calibration curve) expressing the relationship between the viscosity and the viscosity parameter $b_2$ created in advance.

Figure 5:
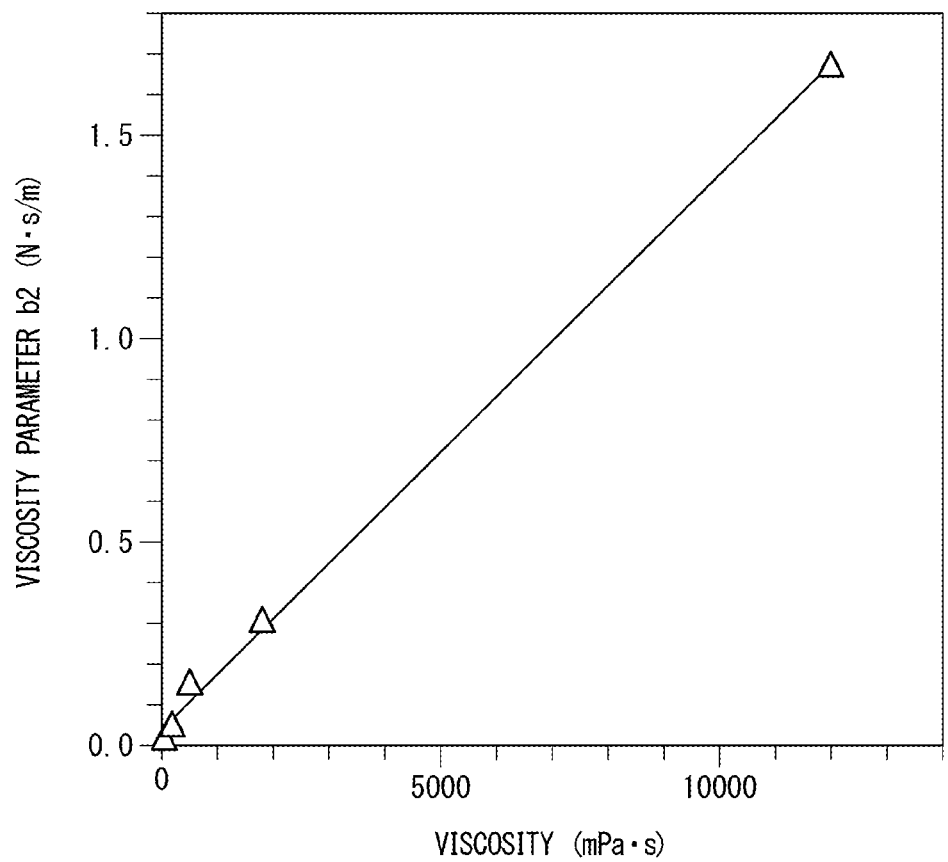
FIG. 5 is a graph showing the relationship between a viscosity and a viscosity parameter b2 in a high viscosity region.

FIG. 5 shows the relationship between the viscosity (mPa·s) of the sample liquid and the viscosity parameter $b_2$ (N·s/m). Linearity was confirmed within the measured range.

Example 2

Using the viscometer shown in FIG. 1, the viscosities of seven types of a viscosity standard solution (bulk viscosity: 2.0 mPa·s, 8.3 mPa·s, 43 mPa·s, 180 mPa·s, 484 mPa·s, 1,800 mPa·s, and 12,000 mPa·s) were measured.

Figure 6:
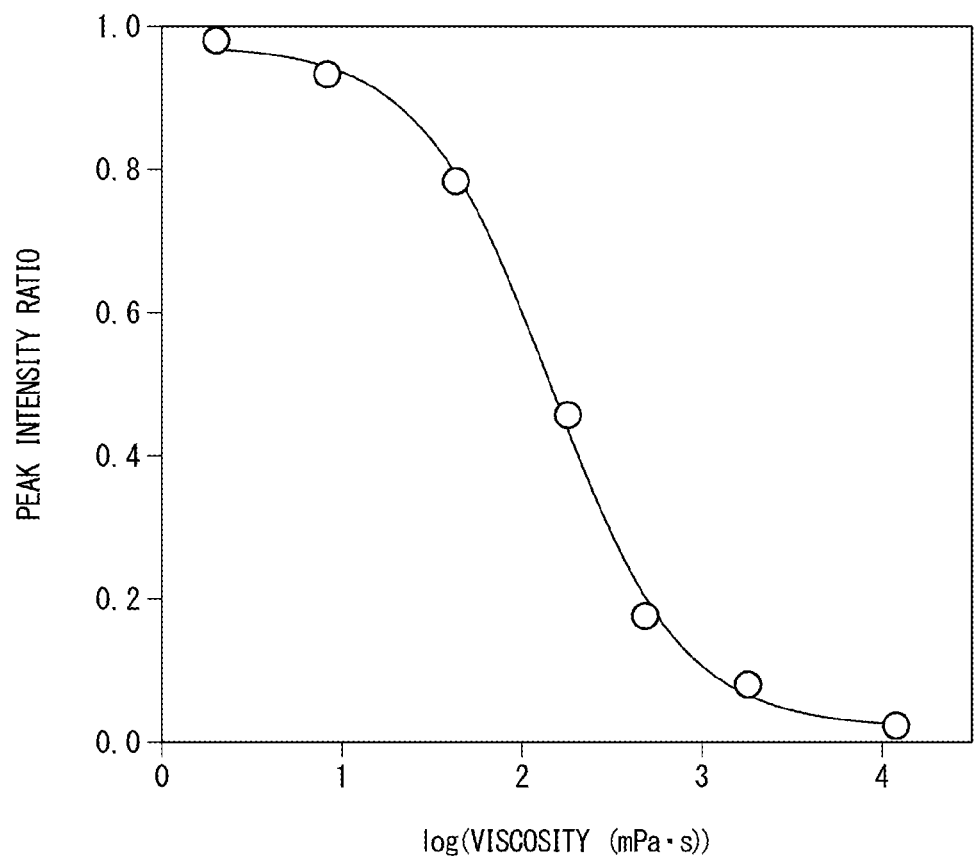
FIG. 6 is a graph showing the relationship between a peak intensity in a resonance curve and a viscosity of a sample liquid.

In the information processing unit 50, a peak intensity ratio of (an amplitude $U_{out}$ of a response voltage)/(an amplitude $U_{in}$ of an applied voltage) was calculated from the output of the strain gauge 19, and a curve (calibration curve) expressing the relationship between the viscosity (mPa·s) of the sample liquid and the peak intensity ratio was created as shown in FIG. 6. A correlation was confirmed within the measured range.

Example 3

An electrolyte G (electrolyte: 1 M $LiPF_6$, solvent:ethylene carbonate:dimethyl ethylene solution=1:1 (volume ratio, commercially available from Kishida Chemical Co., Ltd.)) for a lithium ion battery was prepared.

20 μL of the electrolyte G was inserted into the sample insertion part 21 between the lower surface of the upper disk substrate 16 and the upper surface of the lower disk substrate 14 of the viscometer 1 shown in FIG. 1. When the electrolyte G was inserted into the sample insertion part 21, a sinusoidal AC voltage was applied to the piezoelectric element 15 while changing the frequency, and thus the response voltage from the strain gauge 19 due to vibration of the upper unit 10 was measured, and the information processing unit 50 created a resonance curve.

The viscosity parameter $b_2$ obtained by analyzing the obtained resonance curve with a physical model was calculated, and the viscosity of the electrolyte G could be determined as 1.3 mPa·s from a straight line (calibration curve) expressing the relationship between the viscosity and the viscosity parameter $b_2$ created in advance.

The same electrolyte G was used in a self-made lithium ion battery, and charging and discharging were repeated 10 times under the condition of 1C.

Then, the taken out electrolyte was used as an electrolyte H, and the viscosity was measured in the same manner.

20 μL of the electrolyte H was inserted into the sample insertion part 21 between the lower surface of the upper disk substrate 16 and the upper surface of the lower disk substrate 14 of the viscometer 1 shown in FIG. 1 with a microsyringe, the response voltage was measured, and a resonance curve was created. The distance D between the lower surface of the upper disk substrate 16 and the upper surface of the lower disk substrate 14 was 5 μm.

The viscosity parameter $b_2$ obtained by analyzing the obtained resonance curve with a physical model was calculated, and the viscosity of the electrolyte H could be determined as 10.2 mPa·s from a straight line (calibration curve) expressing the relationship between the viscosity and the viscosity parameter $b_2$ created in advance.

The amount of the electrolyte that could be taken out from the inside of the lithium secondary battery after use was several tens of μL, and it was difficult to measure with a commercially available viscometer. When the viscometer of the present invention was used, it was possible to measure the viscosity of a very small amount of an electrolyte sample taken out from the inside of the lithium secondary battery after use.

Example 4

Using the viscometer shown in FIG. 1, the viscosity of ethylene glycol (commercially available from Nippon Shokubai Co., Ltd.; bulk viscosity: 19.9 mPa·s (Chemistry Handbook, Basic Edition, Revised 5th Edition, the Chemical Society of Japan, Maruzen, February 2004), 21 mPa·s (Nippon Shokubai Co., Ltd.)) was measured under the same conditions as in Example 1 (the radius of curvature R of the upper disk=20 mm, the distance D=8 μm, and the volume V of the sample liquid=20 μL).

The viscosity of ethylene glycol was measured as 21.0±0.4 mPa·s.

The measured value of the viscosity matched literature data well.

Example 5

The viscosities of an unused electrolyte (electrolyte: 1 M $LiPF_6$, solvent:ethylene carbonate:dimethyl ethylene solution=1:1 (volume ratio, commercially available from Kishida Chemical Co., Ltd.)) of a lithium ion battery, an electrolyte specified for the shipping product and an electrolyte after charging and discharging cycles (charging and discharging were repeated 10 times under the condition of 1C) were measured under the same conditions as in Example 1 (the radius of curvature R of the upper disk=20 mm, the distance D=8 μm, and the volume V of the sample liquid=20 μL).

The viscosity of the unused electrolyte was measured as 3.1 mPa·s.

The viscosity of the electrolyte specified for the shipping product was measured as 5.5 mPa·s.

The viscosity of the electrolyte after the charging and discharging cycles was measured as 6.2 mPa·s.

It was confirmed that the viscosity of the electrolyte after the charging and discharging cycles increased and deteriorated as compared with the unused electrolyte and the electrolyte specified for the shipping product.

Example 6

Using the viscometer shown in FIG. 1, the viscosity of ethylene glycol (commercially available from Nippon Shokubai Co., Ltd.; bulk viscosity: 19.9 mPa·s (Chemistry Handbook, Basic Edition, Revised 5th Edition, the Chemical Society of Japan, Maruzen, February 2004), 21 mPa·s (Nippon Shokubai Co., Ltd.)) was measured under the same conditions (the radius of curvature R of the upper disk=20 mm, the distance D=5 μm, and the volume V of the sample liquid=5 μL) as in Example 1 except that the distance and the volume of the sample liquid were changed.

The viscosity of ethylene glycol was measured as 19.8±0.4 mPa·s.

The measured value of the viscosity matched literature data well.

Example 7

Using the viscometer shown in FIG. 1, the viscosity of blood (4 to 50 volume % of blood was red blood cells (with a diameter of 7 to 8 μm and a thickness of 2 μm)) sampled from ICR mice (female, commercially available from Charles River Laboratories Japan) was measured under the same conditions (the radius of curvature R of the upper disk=20 mm, the distance D=20 μm, and the volume V of the sample liquid=20 μL) as in Example 1 except that the distance was changed.

The viscosity of blood was measured as 3.5 mPa·s.

It was confirmed that the viscosity could be measured with a sample liquid containing particles with a diameter of 5 μm or more.

INDUSTRIAL APPLICABILITY

The viscometer of the present invention can measure the viscosity of a very small amount of a liquid of 50 μL or less, which is not realized with a conventional viscometer. Therefore, even if a sample is very expensive, it takes time to produce a sample, or it is technically difficult to prepare a large amount of a sample, the viscometer of the present invention can measure the viscosity of the sample and can respond to the need for evaluating the viscosity of a small amount of a sample.

REFERENCE SIGNS LIST

1 Viscometer
10 Upper unit
11 Lower unit
12 Lower disk holder
13 Upper disk holder
14 Lower disk substrate
15 Piezoelectric element
16 Upper disk substrate
17 Leaf spring
18 Electric cable
19 Detecting means (strain gauge)
21 Sample insertion part
22 Horizontal plate spring
24 Stage
31 Fixing member
40 Piezoelectric element drive unit
53 Signal cable
50 Information processing unit

The invention claimed is:

1. A viscometer comprising a fixing member, an upper unit, a lower unit, and an information processing unit,
   wherein the upper unit comprises a piezoelectric element, an upper disk substrate, a leaf spring, and a detecting device,
   the lower unit comprises a lower disk substrate, a lower disk holder that fixes the lower disk substrate, and a stage on which the lower disk holder is placed,
   the leaf spring coupled to the fixing member and coupled to the upper disk substrate, the leaf spring configured to support the upper disk substrate such that the upper disk substrate is able to vibrate with respect to the fixing member in one direction,
   the piezoelectric element drives the upper disk substrate,
   the upper disk substrate is placed so as to face with the lower disk substrate,
   the information processing unit is connected to the detecting device via a signal cable, and measures a response voltage of the detecting device during resonance of the upper unit, and
   the stage is able to be displaced in a direction such that a distance between a lower surface of the upper disk substrate and an upper surface of the lower disk substrate is able to be changed, and
   wherein a viscosity of a sample is measured by a method, comprising:
   (i) disposing the sample into a sample insertion part between the lower surface of the upper disk substrate and the upper surface of the lower disk substrate in the viscometer,
   (ii) applying an AC voltage to the piezoelectric element while changing a frequency, and
   (iii) measuring, by the information processing unit, a response voltage of the detecting device during resonance of the upper unit, and determining the viscosity of the sample.

2. The viscometer according to claim 1, further comprising a drive system that displaces the stage in the direction such that the distance is changed.

3. The viscometer according to claim 2, further comprising a distance measuring device that measures the distance between the lower surface of the upper disk substrate and the upper surface of the lower disk substrate.

4. The viscometer according to claim 2, wherein the distance between the lower surface of the upper disk substrate and the upper surface of the lower disk substrate is changeable in a range of 0.1 to 1,000 μm.

5. The viscometer according to claim 4, wherein the detecting device comprises a strain gauge.

6. The viscometer according to claim 2, wherein the detecting device comprises a strain gauge.

7. The viscometer according to claim 3, wherein the distance between the lower surface of the upper disk substrate and the upper surface of the lower disk substrate is changed by separating from a contact position while measuring the distance by the distance measuring device.

8. The viscometer according to claim 3, wherein the distance between the lower surface of the upper disk substrate and the upper surface of the lower disk substrate is changeable in a range of 0.1 to 1,000 μm.

9. The viscometer according to claim 8, wherein the detecting device comprises a strain gauge.

10. The viscometer according to claim 3, wherein the detecting device comprises a strain gauge.

11. The viscometer according to claim 7, wherein the distance between the lower surface of the upper disk substrate and the upper surface of the lower disk substrate is changeable in a range of 0.1 to 1,000 μm.

12. The viscometer according to claim 7, wherein the detecting device comprises a strain gauge.

13. The viscometer according to claim 1, wherein the detecting device comprises a strain gauge.

\* \* \* \* \*